(12) United States Patent
Marumoto et al.

(10) Patent No.: US 7,088,471 B2
(45) Date of Patent: Aug. 8, 2006

(54) DENSITY CORRECTION METHOD AND PRINTING APPARATUS EMPLOYING THE SAME

(75) Inventors: Yoshitomo Marumoto, Kanagawa (JP); Makoto Shioya, Kanagawa (JP); Tsuyoshi Shibata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 402 days.

(21) Appl. No.: 10/754,962

(22) Filed: Jan. 9, 2004

(65) Prior Publication Data
US 2004/0141209 A1   Jul. 22, 2004

(30) Foreign Application Priority Data
Jan. 14, 2003   (JP) .............................. 2003-006371

(51) Int. Cl.
*G06F 15/00*   (2006.01)
*G06K 1/00*   (2006.01)
(52) U.S. Cl. .................... 358/1.9; 358/3.1; 358/1.8
(58) Field of Classification Search ................. 358/1.1, 358/1.8, 1.9, 1.14, 3.01, 3.02, 3.1, 3.23, 1.12, 358/502
See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,463,359 A | 7/1984 | Ayata et al. | 346/1.1 |
| 4,723,129 A | 2/1988 | Endo et al. | 346/1.1 |
| 4,740,796 A | 4/1988 | Endo et al. | 346/1.1 |
| 5,784,484 A * | 7/1998 | Umezawa | 382/148 |
| 6,134,355 A * | 10/2000 | Yamada et al. | 382/272 |

FOREIGN PATENT DOCUMENTS

| | | | |
|---|---|---|---|
| JP | 62154873 A * | 7/1987 | |
| JP | 05-069545 | 3/1993 | |
| JP | 2004-058284 | 2/2004 | |

* cited by examiner

*Primary Examiner*—Douglas Q. Tran
(74) *Attorney, Agent, or Firm*—Morgan & Finnegan LLP

(57) ABSTRACT

Density correction method capable of performing density correction at high speed with high precision. In a printing apparatus adopting this method, a predetermined test pattern image is printed on a printing medium, the printed test pattern image is optically read by a sensor at first resolution, the quality of the read image is evaluated, based on the evaluation result the printed test pattern image is optically read by the sensor at second resolution higher than the first resolution, and correction data is generated based on the read test pattern image.

10 Claims, 9 Drawing Sheets

DENSITY CORRECTION METHOD AND PRINTING APPARATUS EMPLOYING THE SAME

This application claims priority under 35 U.S.C. § 119 from Japanese Patent Application No. 2003-006371, entitled "Density Correction Method" and filed on Jan. 14, 2003, the entire contents of which are incorporated herein by reference.

FIELD OF THE INVENTION

The invention relates to a density correction method and a printing apparatus employing the method and, more particularly, to a density correction method adopted by a printing apparatus incorporating, e.g., an inkjet printhead.

BACKGROUND OF THE INVENTION

Currently known printing methods adopted by printing apparatuses include: a thermal transfer method which utilizes thermal energy to transfer ink of an ink ribbon to a printing medium such as printing paper; an inkjet printing method which performs printing by discharging an ink droplet to be attached to a printing medium such as printing paper; and so forth.

In particular, a printing apparatus employing an inkjet printing method is widely adopted by printers, copying machines or the like, since it has advantages of low noise, low running cost, ease of downsizing the apparatus, and ease of color printing.

The aforementioned printing apparatus employing an inkjet printing method generally utilizes a printhead which has a plurality of integrally arranged printing elements for improved printing speed. The printing elements normally include nozzles and ink discharge orifices for discharging ink. The major problem of such inkjet printing apparatus is printing unevenness. Differences in ink discharging characteristics of the plural nozzles cause density unevenness in a printed image.

Various methods have been proposed to prevent such unevenness and achieve high quality. For instance, according to a multi-pass printing method, one printing region of a printing medium is printed by scanning a printhead plural numbers of times. To make full use of the multi-pass printing, the number of times of scanning in one printing region must be increased, in other words, the number of division must be increased. This causes a reduced throughput.

As another method of preventing an occurrence of density unevenness without using the divisional printing method, Japanese Patent Application Laid-Open No. 5-69545 proposes a head shading method.

According to this method, a predetermined test pattern for determining a correction value is first printed by a printhead on a printing medium. The image of the printed test pattern is read by a scanner having a CCD (Charged Coupled Device) or the like, then appropriate position correction is performed on the read image, and image density thereof is allocated to respective rasters corresponding to nozzles of the printhead. A variation of the printing density is caused by errors in the amount of discharge from each nozzle, deviation of the ink discharge direction, ink blur on a printing medium, and the like.

Based on the density allocated for each raster, a correction value of the printing density for each nozzle is determined. Based on the correction value, a γ table for each nozzle or a driving table for each nozzle are changed to adjust the amount of ink discharge. For a raster whose printing density is high in the non-correction state, density correction such as output γ correction is performed so as to decrease the density. For a raster whose printing density is low in the non-correction state, density correction such as output γ correction is performed so as to increase the density. The density unevenness is reduced by the above-described correction.

However, the conventional head shading method has a problem in that it takes a long time to measure the printing density of the test pattern.

Particularly, since the number of nozzles of a recent inkjet printhead extends to several thousands, the region subjected to correction is expanding. Furthermore, in order to meet the recent demands for high quality images, high precision is required to measure the printing density of the test pattern.

Since it is necessary to perform density measurement in a wide region with high precision, the conventional density correction method is approaching its limit in the effort to reduce the measurement time.

SUMMARY OF THE INVENTION

Accordingly, the present invention is conceived as a response to the above-described disadvantages of the conventional art.

For example, a density correction method according to the present invention is capable of performing density correction at high speed with high precision.

According to one aspect of the present invention, preferably, a density correction method used for performing printing on a printing medium, comprises: a printing step of printing a predetermined test pattern image on the printing medium; a first reading step of optically reading the predetermined test pattern image, printed in the printing step, at first resolution using a sensor; a detection step of detecting a deteriorated image-quality portion in the image read in the first reading step; a second reading step of optically reading the deteriorated image-quality portion at second resolution higher than the first resolution using the sensor, the deteriorated image-quality portion being detected in the detection step from the predetermined test pattern image printed in the printing step; and a generation step of generating correction data based on the image read in the second reading step.

The aforementioned steps of the density correction method are described further in detail. In the second reading step, a neighboring area of the portion determined to have deteriorated image quality in the detection step is read. In the generation step, correction data is at least generated with respect to the printing element which has printed the portion determined as deteriorated image quality in the detection step. It is preferable that the density correction method further comprises the step of substituting the correction data, generated in the generation step, for previously used correction data.

Furthermore, it is preferable that the density correction method further comprises the step of partially reading the predetermined test pattern image at the second resolution, even in a case where it is determined as a result of detection in the detection step that image quality is excellent.

Note that it is preferable that the aforementioned printhead is an inkjet printhead. In this case, the inkjet printhead preferably comprises an electrothermal transducer, which generates heat energy to be applied to ink, for discharging ink utilizing the heat energy, or a piezo-element for generating mechanical energy to be applied to ink.

Furthermore, the inkjet printhead has plural columns of nozzles for discharging black, cyan, magenta, and yellow inks respectively.

According to another aspect of the present invention, it may be realized by applying the above method to a printing apparatus. The printing apparatus preferably has the following construction.

More specifically, a printing apparatus performing printing on a printing medium, comprises: test pattern printing means for printing a predetermined test pattern image on the printing medium; reading means capable of optically reading the test pattern image on the printing medium at first resolution or second resolution higher than the first resolution; first reading control means for controlling the reading means to read the predetermined test pattern image, printed by the test pattern printing means, at the first resolution; detection means for detecting a deteriorated image-quality portion in the image read at the first resolution; second reading control means for controlling the reading means to read the deteriorated image-quality portion at the second resolution, the deteriorated image-quality portion being detected by the detection means from the predetermined test pattern image printed by the test pattern printing means; and generation means for generating correction data based on the test pattern image read at the second resolution.

The invention is particularly advantageous since it realizes density correction that can achieve both high speed and excellent correction quality.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

Figure 1:
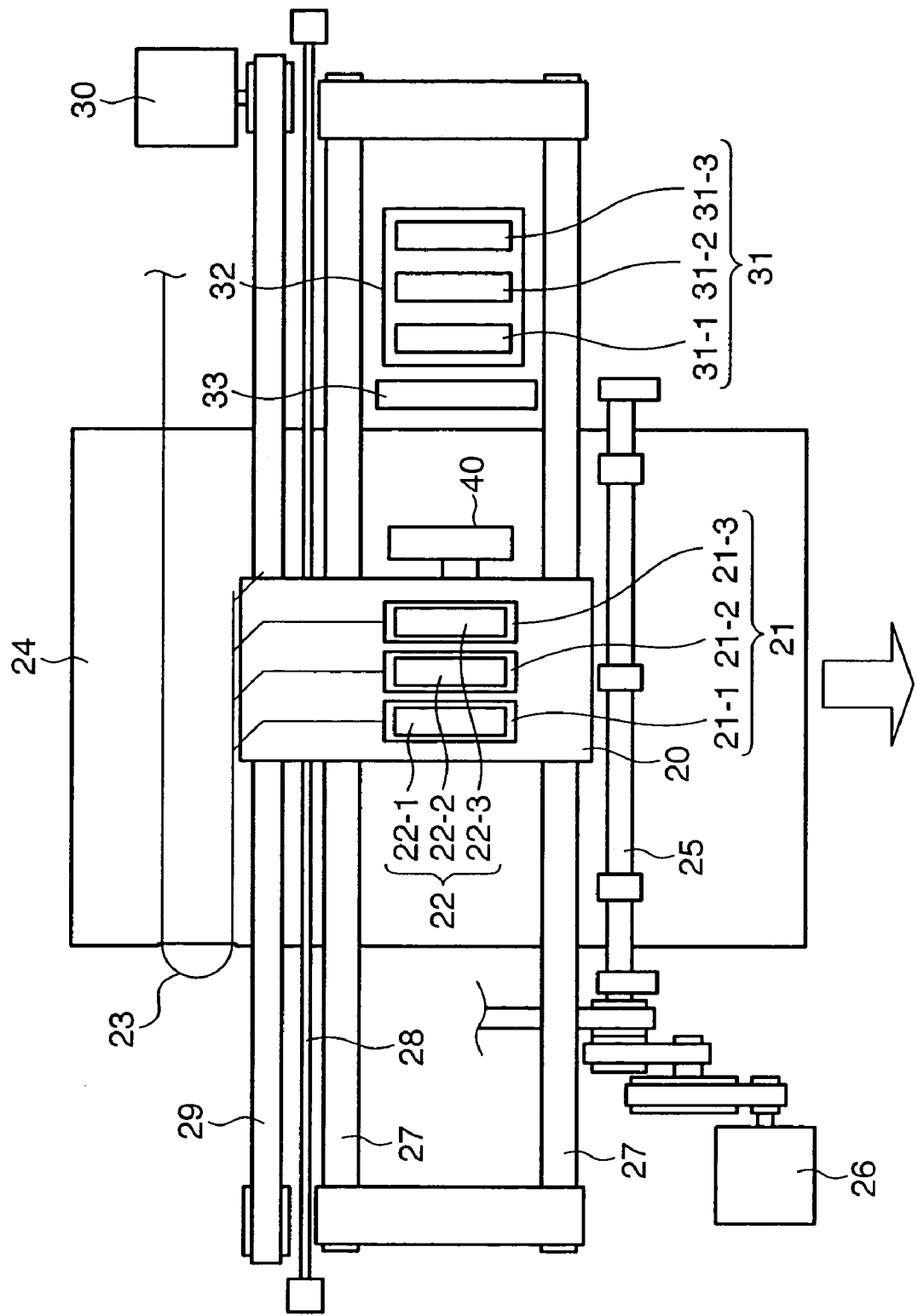
FIG. 1 is a top view showing an external appearance of an inkjet printing apparatus serving as an embodiment of the present invention.

FIG. 1 is a top view showing an overall configuration of an inkjet printing apparatus (hereinafter referred to as a printing apparatus) serving as a typical embodiment of the present invention.

As shown in FIG. 1, three inkjet printheads 21-1 to 21-3 (hereinafter referred to as a printhead) are mounted on a carriage 20. In each of the printheads, a plurality of ink discharge orifices are arranged for discharging ink. The printheads 21-1, 21-2, and 21-3 are provided respectively to discharge cyan (C), magenta (M), and yellow (Y) inks. Ink cartridges 22-1, 22-2, and 22-3 are constructed respectively with the printheads 21-1, 21-2, and 21-3 and ink tanks supplying ink to the corresponding printheads. In the following description, reference numeral 21 indicates the entire printhead, and reference numeral 22 indicates the entire ink cartridge.

Note that, although this embodiment describes, as an example, the construction for performing color printing with three colors of ink (C, M and Y), the construction may also include an ink cartridge, having an ink tank containing black (Bk) ink and a printhead for discharging Bk ink.

In the carriage 20, a reflection-type density sensor 40 is provided. Along with the movement of the carriage 20, the density sensor 40 can sense a test pattern printed at a predetermined location of a printing medium.

Figure 7:
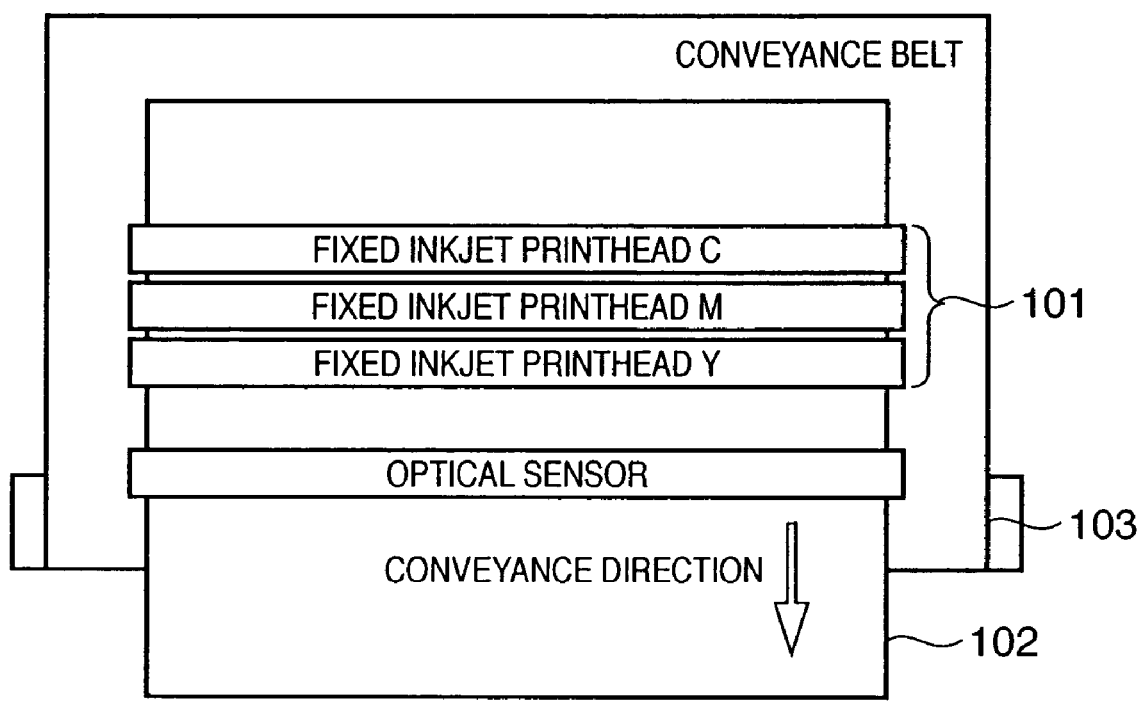
FIG. 7 is a perspective view showing an external appearance of a fixed full-line multiple-head inkjet printing apparatus serving as a typical embodiment of the present invention.

However, the present invention is most effectively applied to a printing apparatus employing a fixed printhead shown in FIG. 7, e.g., a long full-line multiple-type printhead. The reason is that, since the full-line multiple-type printhead has a large number of ink discharge nozzles, it takes a long time to generate correction data for the entire nozzle area. In the construction shown in FIG. 7, a conveyance unit, including a conveyance belt 103, for conveying a printing medium 102 is arranged with respect to the fixed full-line inkjet printhead 101. Ink is discharged from the inkjet nozzles in accordance with the movement of the printing medium, thereby forming an image on the printing medium.

Control signals and image signals are transmitted from a control circuit of the printing apparatus to the printhead 21 through a flexible cable 23.

A printing medium 24, e.g., plain paper, high-quality specialized paper, an OHP sheet, glossy paper, glossy film, a postcard or the like, is transferred through a conveyance roller (not shown) and held tightly by a discharge roller 25, then conveyed in the direction of the arrow (sub-scanning direction) along with the driving of a conveyance motor 26. The carriage 20 is guided and supported by a guide shaft 27 and a linear encoder 28. The carriage 20 is reciprocally driven along the guide shaft 27 by driving a carriage motor 30 through a driving belt 29. The direction of the carriage movement is called a main-scanning direction.

A heating element (electrothermal transducer), which generates heat energy for discharging ink, is provided in the internal portion (liquid channel) of the ink discharge orifice of the printhead 21. In accordance with the reading timing of the linear encoder 28, the heating element is driven based on a printing signal to discharge an ink droplet from an ink discharge orifice of the printhead, and the ink droplet is attached to the printing medium, thereby forming an image.

A recovery unit 32 having a cap unit 31 is provided at a home position of the carriage 20, which is set outside the printing area. When printing is not performed, the carriage 20 is moved to the home position to seal the ink discharge orifice surfaces of the printheads 21-1 to 21-3 with corresponding caps 31-1 to 31-3 of the cap unit 31. This prevents the orifice from clogging, which is caused by ink coagulation due to drying of ink solvent or deposition of foreign substances such as dust.

The capping function of the cap unit 31 is also used in dummy discharge, in which ink is discharged to the cap unit 31 positioned away from the ink discharge orifice so as to fix discharge failure or clear clogging of an ink discharge orifice which is not often used in printing. The capping function is also used to recover a discharge orifice in which discharge failure occurred, by activating a pump (not shown) while the discharge orifices are capped, and sucking ink from the discharge orifices. When the printheads 21-1 to 21-3 pass above the ink receiving unit 33 immediately before a printing operation, the printheads perform preliminary discharge toward the ink receiving unit 33.

Although not shown in the drawing, it is preferable to provide a blade and a wiper in a position adjacent to the cap unit 31 to clean the ink discharge orifice surfaces of the printhead 21.

Figure 2:
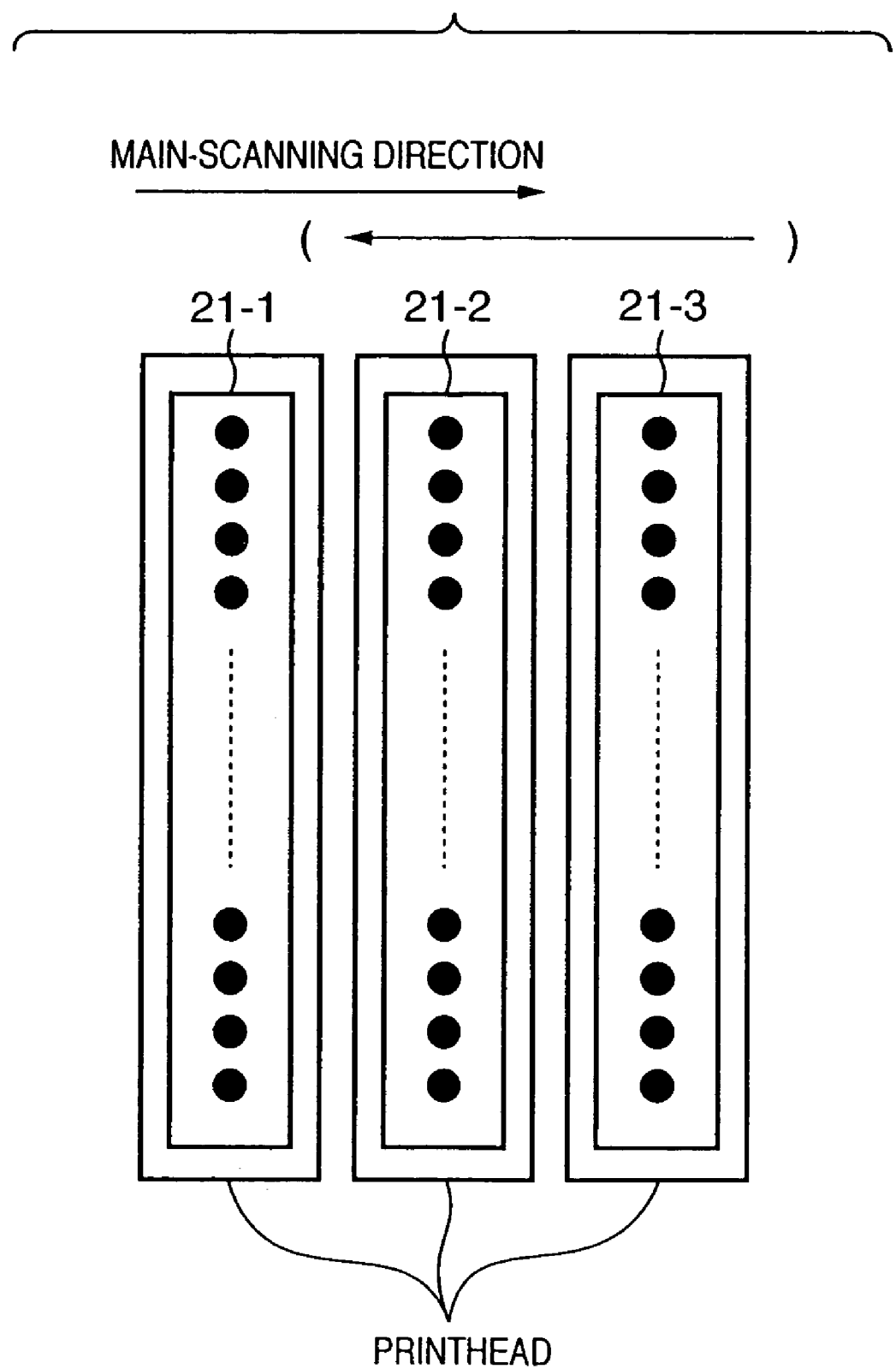
FIG. 2 is a view showing a configuration of a printhead mounted in the inkjet printing apparatus shown in FIG. 1.

FIG. 2 is a view showing a configuration of the printhead 21.

As shown in FIG. 2, the printhead 21 has a large number of ink discharge nozzles (hereinafter referred to as nozzles) in a direction generally perpendicular to the main-scanning direction. Although FIG. 2 shows an example where each printhead has one column of nozzles, each printhead may have plural columns of nozzles, and the nozzles do not always have to be linearly arranged. The interval between nozzles is called a resolution of the printhead, and will also be referred to as a nozzle pitch or a density of the nozzle.

It is preferable to configure the printing apparatus so that printing corresponding to the width of the nozzle columns that discharge ink is realized by moving the printhead in the main-scanning direction shown in FIG. 2. The printing may be performed in both the forward and backward movement of the printhead. The number of printheads may correspond to the number of colors of ink used in the printing. For instance, full-color printing may be realized with three colors: cyan (C), magenta (M), and yellow (Y). In the case of printing images with dark and light colors of ink, printheads discharging dark cyan (C), light cyan (LC), dark magenta (M), light magenta (LM), dark black (Bk), light black (LBk), dark yellow (Y), light yellow (LY), and other special colors may be prepared.

Note that an inkjet printing method applicable to the present invention is not limited to the bubble-jet method employing the heating elements (heaters). For instance, in the case of a continuous type which continuously discharges ink droplets to be changed into particles, a charged control method or a divergence control method may be employed. In the case of an on-demand type which discharges an ink droplet in accordance with necessity, a pressure control method which discharges an ink droplet from an orifice by mechanical vibration of a piezo-vibrator may be employed.

Figure 3:
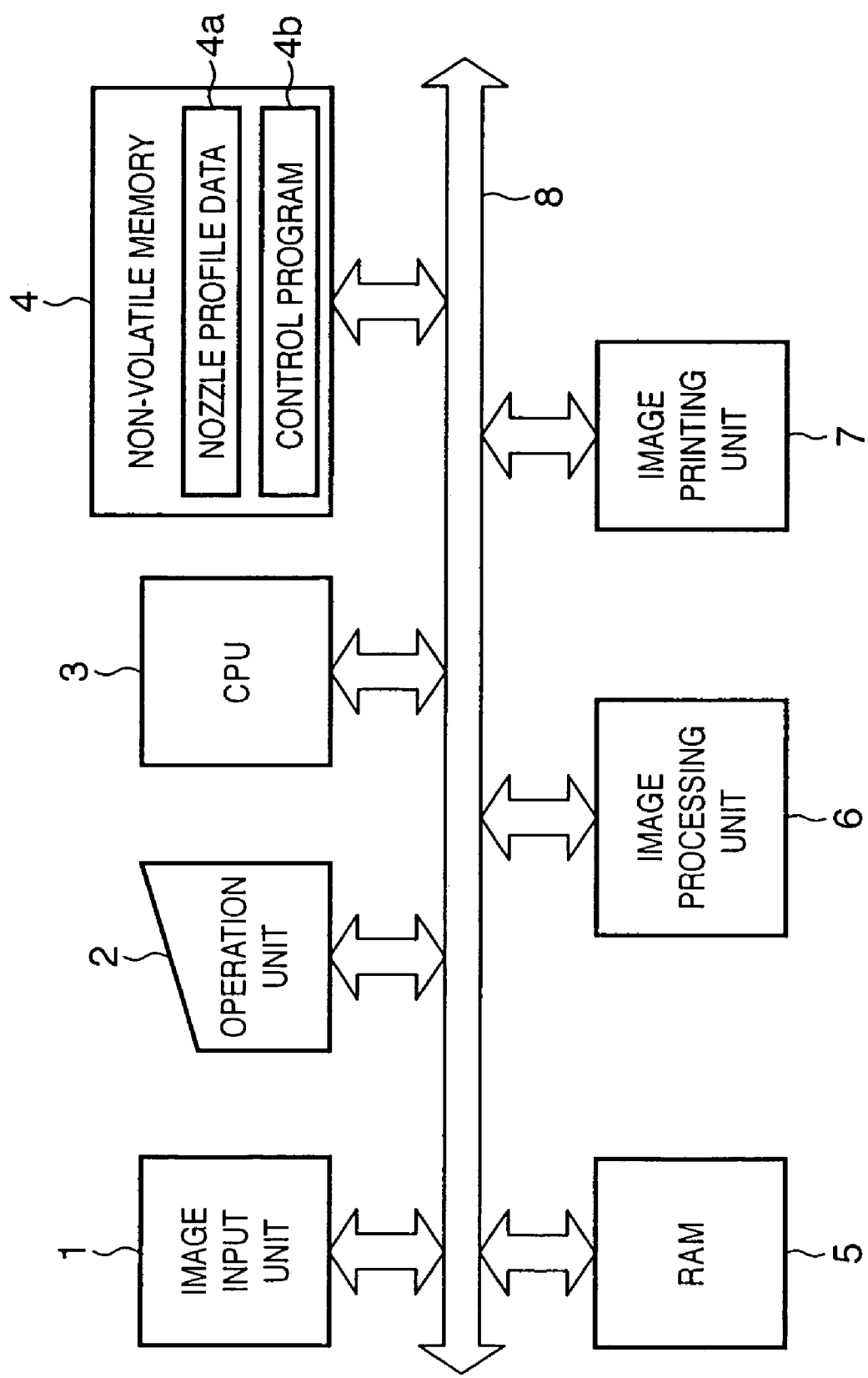
FIG. 3 is a block diagram showing a control circuit of the inkjet printing apparatus shown in FIG. 1.

FIG. 3 is a block diagram showing a control circuit of the printing apparatus shown in FIG. 1.

In FIG. 3, reference numeral 1 denotes a data input unit; 2, an operation unit; 3, a CPU for performing various processing; 4, a non-volatile memory for storing various data; 4a, a printing information storage unit for storing discharge failure and/or defective nozzle data corresponding to respective nozzles, and printing data of the printhead; 4b, a program storage unit for storing various control programs; 5, RAM; 6, an image data processing unit; 7, an image printing unit for performing image output; and 8, a bus for transferring various data.

Next, the aforementioned components are described in detail.

The image data input unit 1 serves as an interface for inputting multivalued image data from an image input device, e.g., a scanner or a digital camera, or multivalued image data stored in a hard disk of a personal computer. The operation unit 2 comprises various keys for setting various parameters and instructing start of a printing operation. The CPU 3 controls the entire printing apparatus in accordance with the various programs stored in the non-volatile memory 4.

The non-volatile memory 4 stores programs for causing the printing apparatus to operate in accordance with the control program and an error-processing program. The operation of the embodiment which will be described below is realized by executing these programs. Note that the non-volatile memory 4 may be realized in various forms, e.g., ROM, a FD, a CD-ROM, a HD, a memory card, a magnetic optical disk (OMD), EEPROM, FeRAM, MRAM, DVD-ROM and so forth. The type of storage medium to be used depends upon the processing speed and cost required in the printing apparatus. However, for a storage area used as the printing information storage unit 4a, it is desirable to adopt non-volatile memory having a relatively fast accessing speed, e.g., EEPROM, FeRAM or the like.

The RAM 5 is used as a work area of the various programs stored in the non-volatile memory 4, a temporary saving area at the time of error processing, or a work area at the time of image processing. Various tables stored in the non-volatile memory 4 may be copied to the RAM 5 to be subjected to alteration, and image processing may be performed while referring to the altered tables.

It is possible that the CPU 3 substitutes for the image data processing unit 6 by executing a program. However, from the aspect of processing speed, a dedicated processor is preferably used. The image data processing unit 6 quantizes multivalued image data, inputted by the image input unit 1, to N-ary image data in units of pixel, and generates a discharge pattern corresponding to a tone value "T" represented by the quantized pixel. In other words, inputted multivalued image data is quantized to N-ary data, and a discharge pattern corresponding to a tone value "T" is generated. For instance, in a case where multivalued image data where 8 bits represent 1 pixel (256 tones) is inputted to the image input unit 1, the image data processing unit 6 converts the tone value of output image data to 25-ary data (=24+1).

Note that, although this embodiment employs the multi-valued error diffusion method for T-ary processing of the input tone image data, arbitrary half-toning methods, e.g., average density preserving method, dither matrix method and the like, may be used. Based on the density data of the image, the T-ary processing is repeated for the number of all pixels, thereby forming a binary driving signal, indicative of ink discharge or non-discharge for each pixel with respect to each nozzle.

The image printing unit 7 is a printer engine unit which drives the printhead 21 for discharging ink based on the discharge pattern generated in the image data processing unit 6 or image data inputted from the image input unit 1, and forms a dot image on a printing medium. The bus 8 connects various components in the apparatus to transmit address signals, data, control signals and the like.

Next, the density unevenness correction method executed in the printing apparatus having the above-described configuration is described with reference to FIGS. 4 to 6.

First, a test pattern is printed on a printing medium, and a partial density difference in the pattern is detected by optical measurement. Next, the density data is correlated with respective nozzle positions of the printhead so as to perform so-called head shading. The head shading includes: correction in a manner such that a high-density portion of the output image is printed at lower density and a low-density portion of the output image is printed at higher density; and changing driving control of each nozzle to reduce a driving pulse of a nozzle having a large ink discharge amount, or increase a driving voltage of a nozzle having a small ink discharge amount.

To simplify the description, this embodiment will explain only the density correction of the printhead discharging cyan ink, among the three printheads. The same explanation will apply to the printing operation using other colors of ink.

Needless to say, correction is performed when image quality is poor. Although the image quality may be improved by performing correction, if the characteristic of the printhead changes over time and the discharge state of the printhead changes, the image quality may again become poor. For instance, phenomena such as ink discharge failure, an extreme increase or decrease of an ink discharge amount, or a large deviation of an ink discharging position will cause considerable deterioration of image quality.

A large number of methods have been proposed so far to prevent such phenomena. The methods include: a method in which a test pattern having a uniform density is printed, then the test pattern is read to detect density unevenness, and a raster density is calculated for performing correction; a method in which deviations in print dot diameters and printing positions are detected, and a raster density is calculated for performing correction; a method in which a test pattern having density that changes stepwise is printed, and the test pattern is read to detect density unevenness; and so forth. Furthermore, there are various methods for converting a raster density to correction data. These methods have pros and cons depending on the quality of the image subjected to correction, the type of printing medium on which the image is printed, the type of ink, and so forth. In accordance with these conditions, measurement precision, e.g., resolution of the image to be read or the like, is determined.

To meet the recent demands for high quality images, although in varying degrees, a certain degree of reading precision is required in test pattern measurement. For instance, there is a system available for reading an image at resolution of 2400 dpi to achieve photographic image quality. However, from the aspect of image quality evaluation, there is a case where the resolution does not have to be as high as 2400 dpi (may be, for example, 600 dpi). This is largely related to the sensitivity of human eyes. Human eyes can easily recognize density variations in a relatively low frequency, but are relatively insensitive to density variations in a high frequency.

In view of this aspect, although relatively high precision measurement is required for correction, the present embodiment uses a relatively simple measurement, i.e., a low-resolution image, for image evaluation to determine whether or not correction is necessary.

Figure 8:
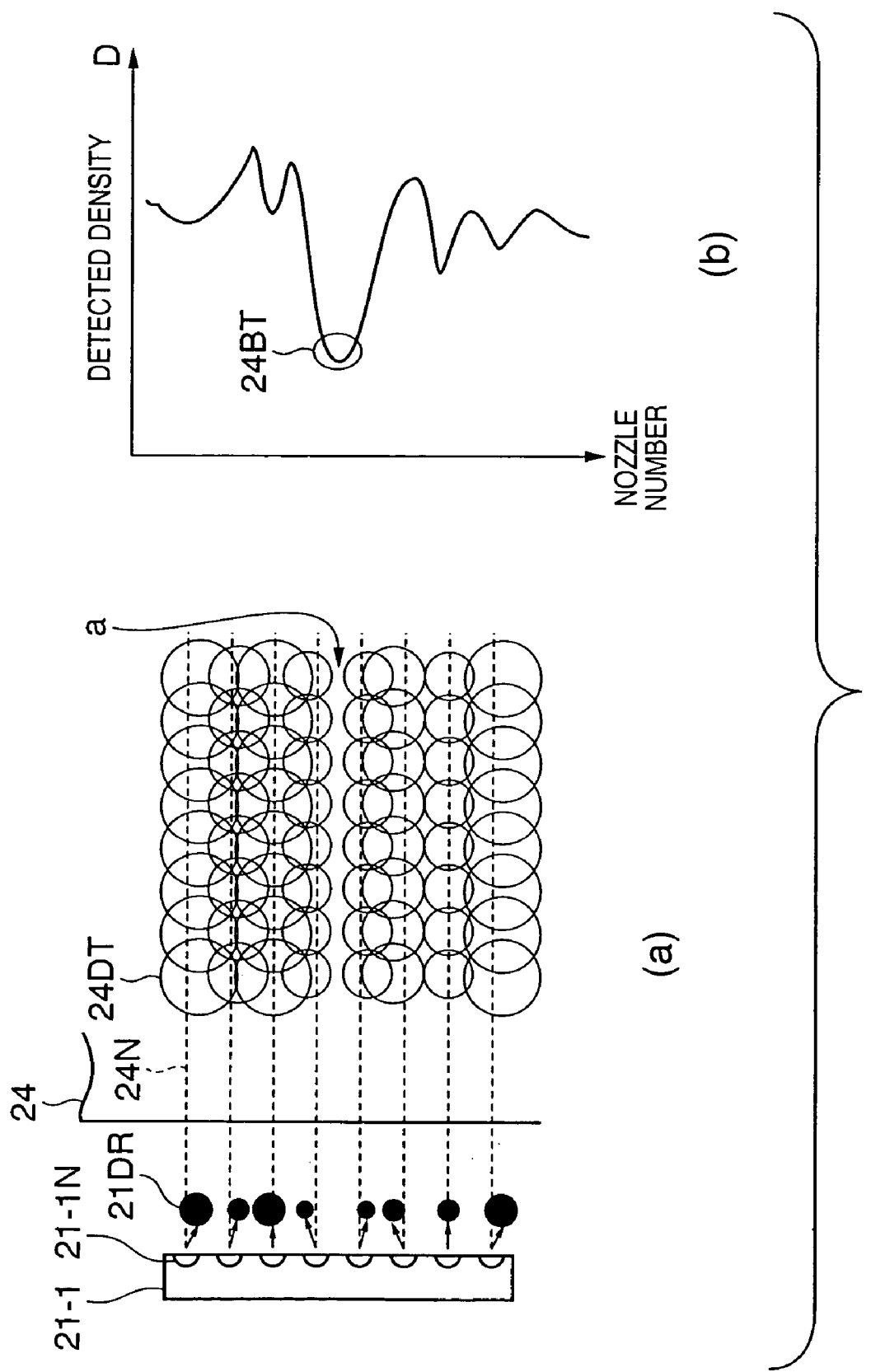
FIG. 8 is a schematic view showing an image read at high resolution (2400 dpi) for density measurement.
Figure 9:
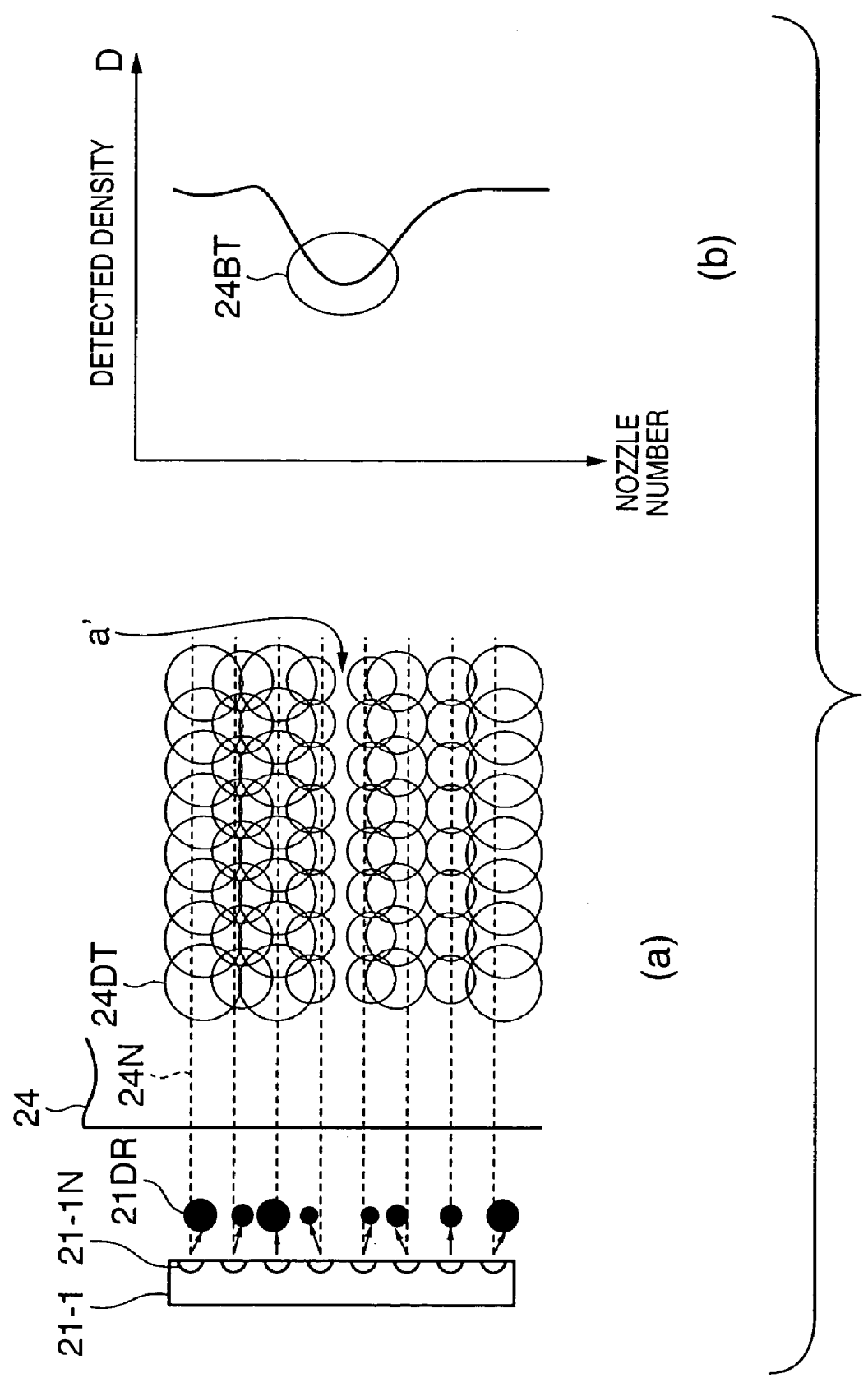
FIG. 9 is a schematic view showing the same image as that of FIG. 8, read at low resolution (600 dpi) for density measurement.

FIGS. 8 and 9 show examples of the same image read at different resolutions.

FIG. 8 is a schematic view showing an image read at high resolution (e.g., 2400 dpi). FIG. 9 is a schematic view showing the same image as that of FIG. 8, read at low resolution (e.g., 600 dpi). Note that the images in FIGS. 8 and 9 are edited to have the same size.

As shown in both (a) of FIG. 8 and (a) of FIG. 9, ink droplets 21DR discharged from the nozzles 21-1N of the printhead 21-1 are attached on the printing medium 24 as printed dots 24D. However, positions of these printed dots are somewhat deviated from an expected normal line 24N shown in broken lines since the directions of discharged droplets are not always straight, some are somewhat going upward and some are somewhat going downward. Portions (b) in FIGS. 8 and 9 respectively show detected density variations with respect to nozzle number at high and low resolutions. Note that the nozzle number is a number identifying each nozzle.

According to the detected density variation shown in (b) of FIG. 8, a sharp drop 24BT is clearly seen. This drop corresponds to a white line indicated by reference letter a in (a) of FIG. 8. In this case, for example information such as the position of the nozzle creating the white line can efficiently be acquired.

On the contrary, according to the detected density variation shown in (b) of FIG. 9 obtained by reading the image at low resolution, although it can be discriminated that there is an image quality deteriorated portion 24BT such as density unevenness, the position of the white line cannot be clearly identified (e.g., as indicated by reference letters a' in (a) of FIG. 9). In this case, it is difficult to discriminate whether the cause of the image deterioration is the lightly colored several pixels due to a reduced amount of ink discharge from the corresponding nozzles or a thin line having a high contrast caused by ink discharge failure of one nozzle out of several nozzles corresponding to the image deterioration portion.

In other words, in the image shown in FIG. 8 read at high resolution, it is possible to tell that the white line is caused by ink discharge failure of one nozzle. However, in the image shown in FIG. 9 read at low resolution, it is impossible to tell whether the density unevenness is caused by a white line generated by ink discharge failure of one nozzle or a white line generated by a reduced amount of ink discharge of several adjacent nozzles.

In a case where the white line is caused by ink discharge failure of one nozzle as presumed from the image in FIG. 8, it is effective to perform complementary printing with neighboring nozzles adjacent to the erroneous nozzle that has caused the discharge failure (refer to, e.g., Japanese Patent Application No. 2002-215847). However, such determination cannot be made based on the image shown in FIG. 9. Therefore, correction is performed using several adjacent nozzles, including the erroneous nozzle that has caused the discharge failure. From the viewpoint of highly precise correction, it is desirable to perform correction based on the image read at high resolution.

However, from the view of reading time, assuming a case of measuring a predetermined region of an image, the image read at low resolution (image in FIG. 9) is advantageous because the measurement time is considerably reduced. Assuming that a line-type CCD performs imaging with two types of optical power (i.e., low resolution and high resolution), the larger the optical power, the smaller the measurement range. In this case, the area that can be sensed by a single scan is inversely proportional to the optical power approximately. In other words, from the aspect of measurement time, the image read at low resolution (i.e., FIG. 9) is preferable.

In view of the above situation, the present embodiment divides the measurement process into an image quality evaluation step and a correction data generation step in order to reduce the measurement and detection time. The former measurement is performed at low optical power (low resolution) while the latter measurement is performed at high optical power (high resolution). The image quality evaluation step is performed to specify a target having density unevenness (target portion having a density error), e.g., a white line or density unevenness having a large swell caused by ink discharge failure of a nozzle, or to determine necessity of correction. The correction data generation step is performed to generate correction data when correction is necessary.

Referring back to the human eye sensitivity to an image, human eyes are sensitive to an object whose density variation has a low frequency, but insensitive to an object whose density variation has a high frequency (e.g., R. P. Dooley and R. Shaw, "Noise Perception in Electrophotography, J. Appl. Photogr. Eng., Vol. 5, pp 190–196, 1979). In other words, because human eyes serve as a low-pass filter, a system transmitting only a relatively low frequency component of an image can sufficiently determine whether or not the image is defective. Even though the present embodiment sets a low optical resolution (e.g., 600 dpi) to perform measurement for image quality evaluation, the goal can sufficiently be attained, given that the human eyes serve as a low-pass filter. When the correction target is determined, actual correction data is generated. The neighborhood of the correction target is once again measured at high resolution (e.g., 1200 or 2400 dpi) to obtain data close to the nozzle resolution, and based on the measurement data, data to be fed back to the nozzle discharge data is generated.

The following correction processing is executed on a regular basis when actual printing is not performed.

Figure 4:
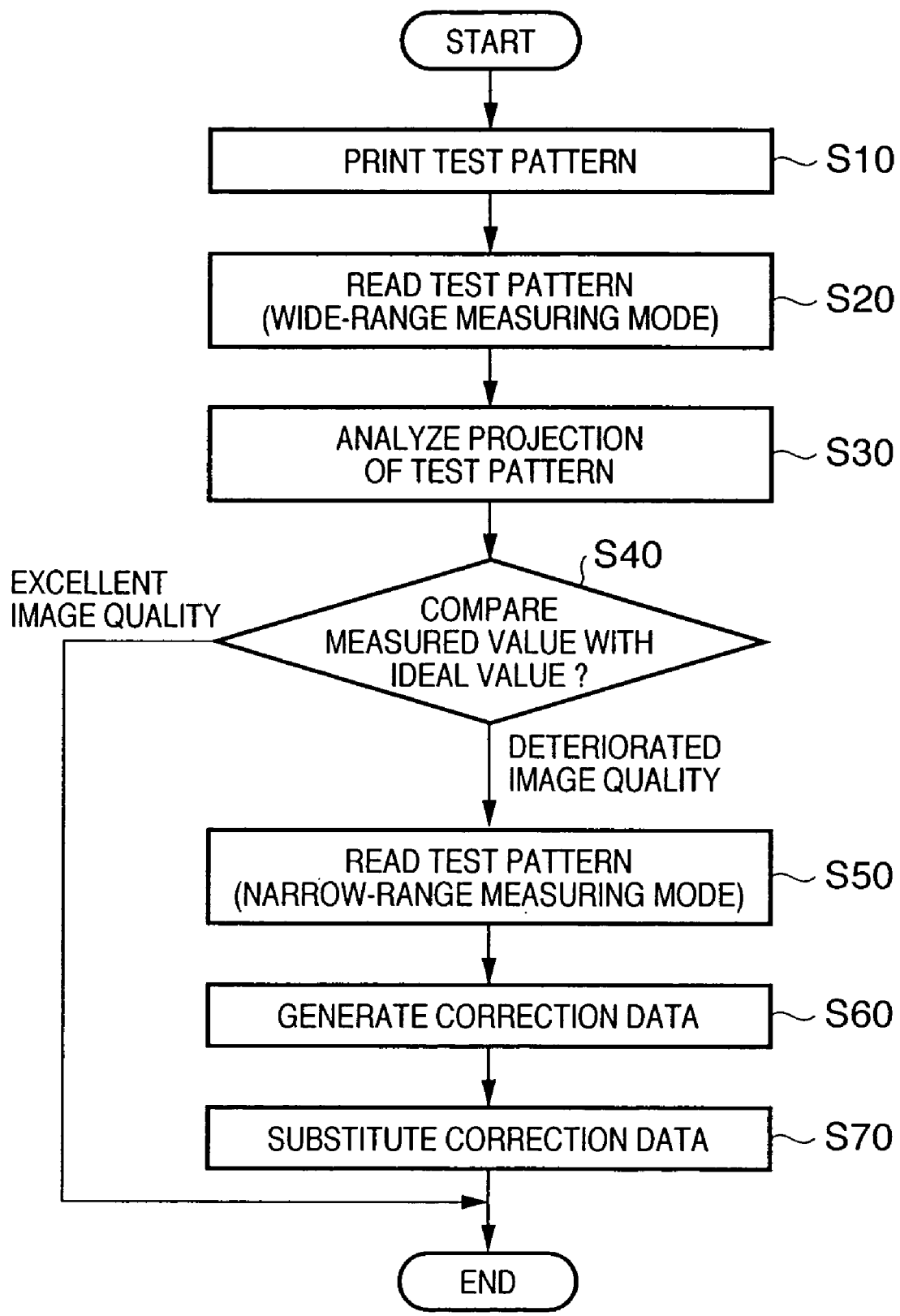
FIG. 4 is a flowchart explaining a density unevenness correction process.

FIG. 4 is a flowchart explaining a density unevenness correction process.

Figure 5:
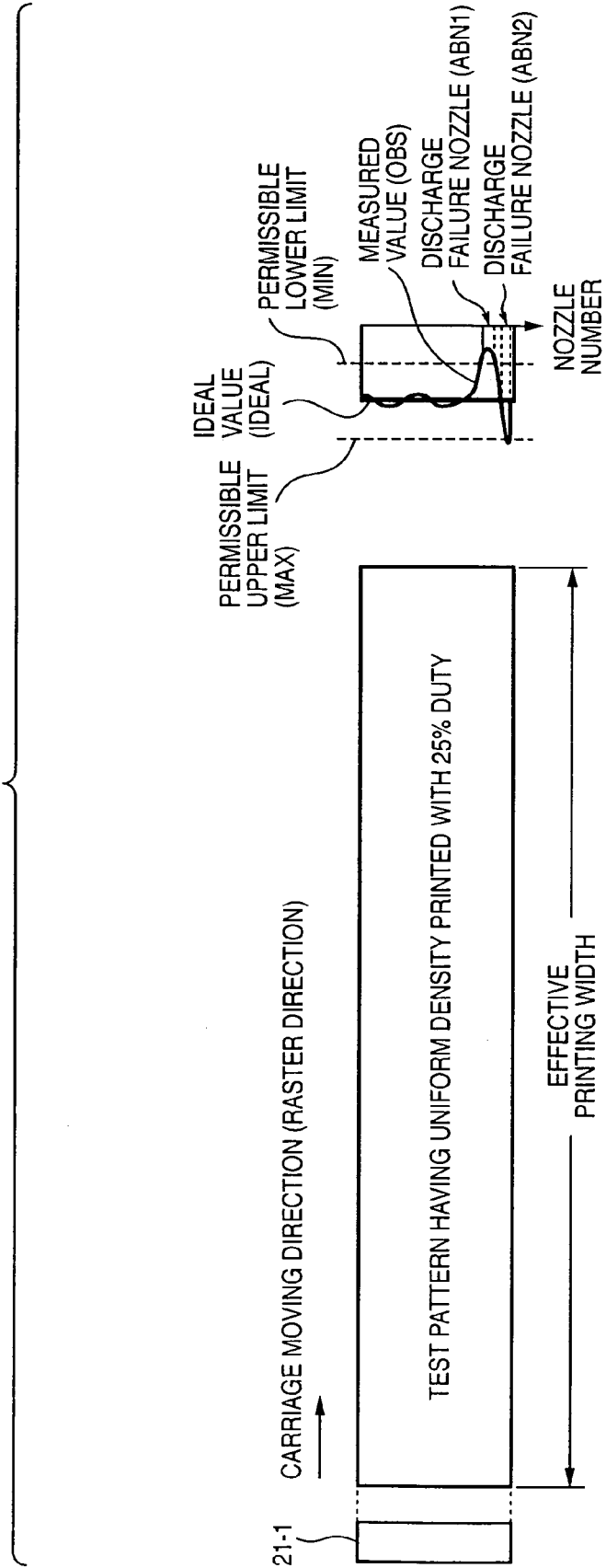
FIG. 5 is a view showing a state in which a printhead 21-1 prints a test pattern by discharging cyan ink, and the test pattern is read to analyze the density.

FIG. 5 is a view showing a state in which a printhead 21-1 prints a test pattern by discharging cyan ink, and the test pattern is read to analyze the density.

In step S10, a test pattern is printed with 25% duty (i.e., ink is discharged from 25% of the entire nozzles of the printhead in one cycle of printing operation) throughout the effective printing width of a printing medium. In step S20, the printed test pattern is optically read and evaluated by a reflection-type density sensor 40 having a CCD sensor as a photoreceptor. Note that, in a case where head shading correction has already been made, when printing a test pattern with 25% duty, a test pattern with head shading correction is printed. By doing this, a portion where head shading correction has already been made and the correction effect has been appeared will not be discriminated as an image qiuality deteriorated area again.

The optical system of the reflection-type density sensor 40 according to this embodiment is capable of enlarge/reduction imaging. In reduction imaging (wide-range measuring mode), a wide range of image can be sensed although the resolution is low. In enlarged imaging (narrow-range measuring mode), a highly precise image can be sensed at high resolution although the image sensing range is small. In the evaluation measurement in step S20, the reflection-type density sensor 40 operates in the wide-range measuring mode. In the wide-range measuring mode, a pattern having the size of 12 inch×1 inch can be read at 600 dpi in 7 seconds.

As has been discussed above, taking the spatial frequency sensitivity of human eyes into consideration, the inventor of the present invention has confirmed that image quality deterioration can be detected from an image read at resolution of 600 dpi.

In step S30, brightness of the test pattern image read at 600 dpi is integrated over the raster direction, and projected. The graph on the right side in FIG. 5 shows a brightness distribution of the projection. The ideal brightness distribution where there is no density unevenness must be represented by the ideal value (IDEAL) indicated in a solid line with respect to the nozzle of the printhead. However, in reality, the measured value (OBS) is deviated from the ideal value.

In step S40 in FIG. 4, the measured value (OBS) is compared with the ideal value (IDEAL) to determine whether or not the deviation falls within a permissible range. In this embodiment, assuming that the read data is expressed by 8-bit data, if the measured value is deviated from the ideal value by "8" or more, it is determined that the image quality is deteriorated in the neighborhood of the target.

If it is determined that the image quality is excellent as a result of the evaluation measurement, image quality measurement for correction is not performed and the processing ends.

On the contrary, if it is determined that the image quality of the raster printed by a specific nozzle is deteriorated, the control proceeds to step S50 for performing correction. For instance, in the example shown in FIG. 5, rasters printed by nozzles ABN1 and ABN2 exceed the permissible lower limit (MIN) and upper limit (MAX). Therefore, it is determined that correction is necessary.

Since the measurement precision of the test pattern printed in step S10 for evaluation measurement is not good enough to generate correction data, the test pattern is measured again. This is called correction measurement. In this measurement, the reflection-type density sensor 40 operates in the narrow-range measuring mode. The measuring range is set so that the raster, which was determined as discharge failure in the evaluation measurement, is centered (e.g., in FIG. 5, the neighborhood of ABN1 and ABN2). In the narrow-range measuring mode, the reflection-type density sensor 40 is capable of measuring at up to 2400 dpi. Therefore, highly precise correction data can be generated.

In step S60, correction data is generated based on the data read at 2400 dpi in step S50. More specifically, each raster density is calculated at the resolution of 2400 dpi, and based on the calculated data, correction data corresponding to the nozzle that has caused discharge failure, or this nozzle and the neighboring nozzles of the nozzle is generated.

Besides this correction method, many other methods are applicable. For instance, measurement may be performed once again to rewrite a correction pattern with respect to the target where unevenness or white lines are detected. In this case, correction may be performed taking the coloring characteristic of ink discharged from the nozzle into consideration, as disclosed in Japanese Patent Application No. 2002-215847. In the above-described manner, printing and measurement of the correction pattern and correction data generation can be performed at high speed with respect to the neighborhood of the correction target where unevenness or white lines are detected.

In step S70, the correction data generated in step S60 substitutes for the corresponding part of the original correction data.

According to the above-described embodiment, a test pattern is read at low resolution for image quality evaluation. If poor image quality is found as a result of the evaluation, the test pattern is read at high resolution for correction data generation. Therefore, highly precise correction can be performed at high speed with respect to each raster.

Note that, in the above-described embodiment, although the processing ends when the result of the evaluation measurement finds excellent image quality, the present invention is not limited to this. For instance, test pattern measurement for correction data generation may be partially performed, and correction data may be generated based on the partially measured data.

Figure 6:
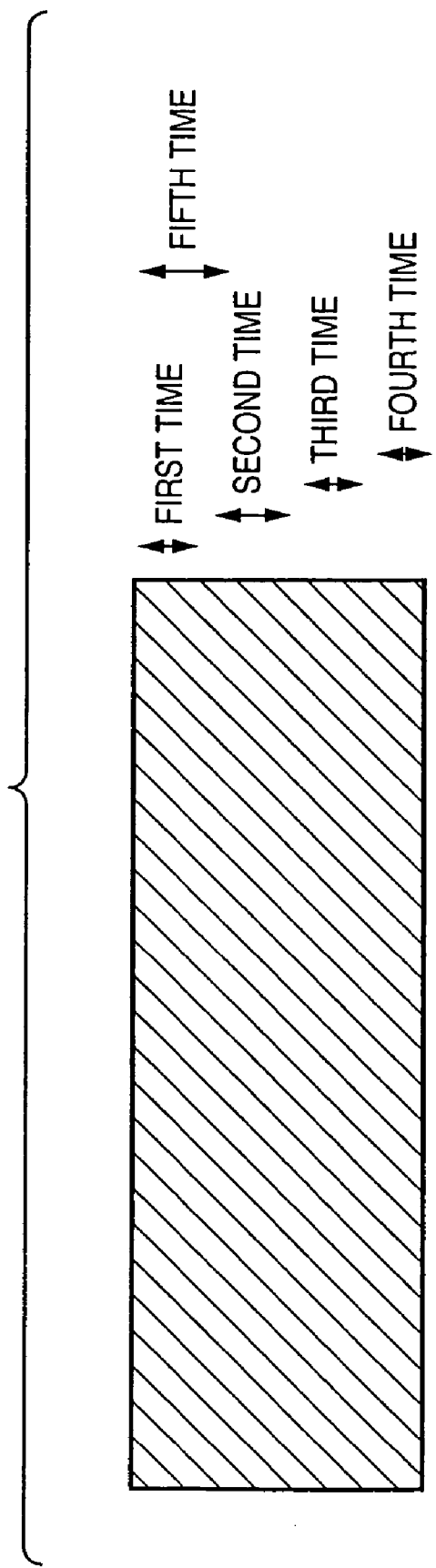
FIG. 6 is a view showing a state of partial correction measurement.

More specifically, even when the result of the evaluation measurement finds excellent image quality, the processing is not terminated, and correction measurement is partially performed from the top end as shown in FIG. 6. When the next evaluation measurement is performed, the partial correction measurement is continued. When printing is requested, the correction data obtained so far in the correction measurement is used. By dividedly performing correction measurement in the foregoing manner, the time necessary for single correction processing can be reduced, and efficient correction measurement can be performed.

Furthermore, although the above-described embodiment employs a test pattern having a uniform density printed with 25% duty, the present invention is not limited to this. Other test patterns, such as a step pattern, a dot pattern or the like may be used.

Furthermore, although the above-described embodiment employs the same test pattern for the image quality evaluation and correction, the present invention is not limited to this. For instance, a test pattern printed with 100% duty may be used for image quality evaluation, and other test patterns, e.g., a step pattern, a dot pattern or the like, may be used for correction. There are cases where it is more effective to use different test patterns for image quality evaluation and correction.

Furthermore, although the above-described embodiment has adopted a configuration utilizing the reflection-type optical sensor capable of operating in different modes (wide-range measuring mode and narrow-range measuring mode) for storing image data in different resolutions, and has described an example of performing image quality evaluation at low resolution and then generating correction data at high resolution based on the evaluation, the present invention is not limited to this. More specifically, either of the following may be adopted: (1) image data is read at different resolutions by a single reflection-type optical sensor capable of reading an image at different resolutions, the read data is stored, image quality evaluation is performed at low resolution, and correction data is generated at high resolution based on the evaluation; or (2) image data is read at one resolution by a single reflection-type optical sensor, the read image data is stored, then image processing, e.g., thinning processing, is performed to obtain low-resolution image data to be used in image quality evaluation, and based on the evaluation, correction data is generated using high-resolution image data on which thinning processing is not performed.

As described above, to generate correction data, image data having two different resolutions (high and low) is necessary. The image data can be obtained by reading image data with an optical sensor at two different resolutions, or by reading image data at one resolution and performing image processing to generate image data having different resolutions.

Note that in the foregoing embodiment, although the description has been provided based on an assumption that a droplet discharged by the printhead is ink and that the liquid contained in the ink tank is ink, the contents are not limited to ink. For instance, the ink tank may contain processed liquid or the like, which is discharged to a printing medium in order to improve the fixability or water repellency of the printed image or to improve the image quality.

The above-described embodiment comprises means (e.g., an electrothermal transducer, laser beam generator, and the like) for generating heat energy as energy utilized upon execution of ink discharge, and adopts the method which causes a change in state of ink by the heat energy, among the ink-jet printing method. According to this printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of so-called an on-demand type or a continuous type. Particularly, in the case of the on-demand type, the system is effective because, by applying at least one driving signal, which corresponds to printing information and causes a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead, and consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with particularly high response characteristics.

As the pulse driving signal, signals disclosed in U.S. Pat. Nos. 4,463,359 and 4,345,262 are suitable. Note that further excellent printing can be performed by using the conditions of the invention described in U.S. Pat. No. 4,313,124 which relates to the temperature rise rate of the heat acting surface.

Furthermore, although the aforementioned embodiment describes a serial-type printer which performs printing by scanning a printhead, a full-line type printer which has a printhead having a length corresponding to the width of a maximum printing medium is applicable to the present invention. As the full-line type printhead, either the arrangement which satisfies the full-line length by combining a plurality of printheads as disclosed in the above specification or the arrangement as a single printhead obtained by forming printheads integrally can be used.

In addition, not only the cartridge type printhead in which an ink tank is integrally arranged on the printhead itself as described in the foregoing embodiment, but also an exchangeable chip type printhead which can be electrically connected to the apparatus main unit and can receive ink from the apparatus main unit upon being mounted on the apparatus main unit is applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independent of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in the aforementioned embodiment of the present invention, it is assumed that the ink is a liquid. Alternatively, the present invention may employ ink which is solid at room temperature or less, or ink which softens or liquefies at room temperature, or ink which liquefies upon application of a printing signal, since it is a general practice to perform temperature control of the ink itself within a range from 30° C. to 70° C. in the ink-jet system, so that the ink viscosity can fall within a stable discharge range.

In addition, the ink-jet printing apparatus of the present invention may be used in the form of a copying machine combined with a reader, and the like, or a facsimile apparatus having a transmission/reception function, in addition to an integrally-provided or stand-alone image output terminal of an information processing equipment such as a computer.

As many apparently widely different embodiments of the present invention can be made without departing from the spirit and scope thereof, it is to be understood that the invention is not limited to the specific embodiments thereof except as defined in the claims.

What is claimed is:

1. A density correction method used for performing printing on a printing medium, comprising:
   a printing step of printing a predetermined test pattern image on the printing medium;
   a first reading step of optically reading the predetermined test pattern image, printed in said printing step, at first resolution using a sensor;
   a detection step of detecting a deteriorated image-quality portion in the image read in said first reading step;
   a second reading step of optically reading the deteriorated image-quality portion at second resolution higher than the first resolution using the sensor, the deteriorated image-quality portion being detected in said detection step from the predetermined test pattern image printed in said printing step; and
   a generation step of generating correction data based on the image read in said second reading step.

2. The density correction method according to claim 1, wherein in said second reading step, a neighboring area of the portion determined as deteriorated image quality in said detection step is read.

3. The density correction method according to claim 1, wherein in said generation step, correction data is at least generated with respect to a printing element which has printed the portion determined as deteriorated image quality in said detection step.

4. The density correction method according to claim 1, further comprising a substituting step of substituting the correction data, generated in said generation step, for previously used correction data.

5. The density correction method according to claim 1, further comprising a partial reading step of partially reading the predetermined test pattern image at the second resolution even in a case where it is determined as a result of detection in said detection step that image quality is excellent.

6. A printing apparatus performing printing on a printing medium, comprising:
   test pattern printing means for printing a predetermined test pattern image on the printing medium;
   reading means capable of optically reading the test pattern image on the printing medium at first resolution or second resolution higher than the first resolution;
   first reading control means for controlling said reading means to read the predetermined test pattern image, printed by said test pattern printing means, at the first resolution;
   detection means for detecting a deteriorated image-quality portion in the image read at the first resolution;
   second reading control means for controlling said reading means to read the deteriorated image-quality portion at the second resolution, the deteriorated image-quality portion being detected by said detection means from the predetermined test pattern image printed by said test pattern printing means; and
   generation means for generating correction data based on the test pattern image read at the second resolution.

7. The printing apparatus according to claim 6, wherein said second reading control means controls to read a neighboring area of the portion determined as deteriorated image quality by said detection means.

8. The printing apparatus according to claim 6, wherein said generation means at least generates correction data with respect to a printing element which has printed the portion determined as deteriorated image quality by said detection means.

9. The printing apparatus according to claim 6, further comprising substituting means for substituting the correction data, generated by said generation means, for previously used correction data.

10. The printing apparatus according to claim 6, further comprising third reading control means for controlling said reading means to partially read the predetermined test pattern image at the second resolution even in a case where it is determined as a result of detection by said detection means that image quality is excellent.

* * * * *

UNITED STATES PATENT AND TRADEMARK OFFICE
CERTIFICATE OF CORRECTION

| | | |
|---|---|---|
| PATENT NO. | : 7,088,471 B2 | Page 1 of 1 |
| APPLICATION NO. | : 10/754962 | |
| DATED | : August 8, 2006 | |
| INVENTOR(S) | : Yoshitomo Marumoto et al. | |

It is certified that error appears in the above-identified patent and that said Letters Patent is hereby corrected as shown below:

On Title Page,
At item (56), insert above "* cited by examiner" the following text -- R.P. Dooley and R. Shaw, "Noise Perception in Electrophotography, J. Appl. Photogr. Eng., Vol. 5, pp. 190-196 (1979).--

Signed and Sealed this

Nineteenth Day of December, 2006

JON W. DUDAS
*Director of the United States Patent and Trademark Office*